(12) United States Patent
Borter

(10) Patent No.: US 6,435,497 B1
(45) Date of Patent: Aug. 20, 2002

(54) V-BLOCK FOR DRILLING ROUND OBJECTS

(76) Inventor: Thomas W. Borter, 406 S. Rockford Dr. Unit 7, Tempe, AZ (US) 85281

( * ) Notice: Subject to any disclaimer, the term of this patent is extended or adjusted under 35 U.S.C. 154(b) by 0 days.

(21) Appl. No.: 09/875,830

(22) Filed: Jun. 7, 2001

(51) Int. Cl.7 ............................................. B23Q 3/00
(52) U.S. Cl. ...................................... 269/296; 269/902
(58) Field of Search ............................... 269/296, 902, 269/104, 43, 268

(56) References Cited

U.S. PATENT DOCUMENTS

| | | | | |
|---|---|---|---|---|
| 2,364,150 A | * | 12/1944 | Lowenstein | 269/296 |
| 2,724,296 A | * | 11/1955 | Parrish et al. | 269/43 |
| 2,932,995 A | * | 4/1960 | Durfee | 269/296 |
| 3,423,885 A | * | 1/1969 | Crandall | 269/296 |
| 4,131,043 A | * | 12/1978 | Colman et al. | 269/296 |
| 4,687,190 A | * | 8/1987 | Yang | 269/239 |

* cited by examiner

Primary Examiner—Joseph J. Hail, III
Assistant Examiner—Lee Wilson
(74) Attorney, Agent, or Firm—H. Gordon Shields

(57) ABSTRACT

V-block apparatus for holding around object being worked on includes a base element which may be appropriately secured to a work bench or to a table of a drill press. The V-block includes a pair of angularly oriented sides or wings which define a trough for receiving a round object. At the juncture of the sides or wings is a bottom slot which may receive the tip of a drill after the round object has been drilled through to provide a pair of diametrically aligned holes. The V-block apparatus also includes friction enhancing elements to aid in holding the round object while the round object is being worked on.

11 Claims, 2 Drawing Sheets

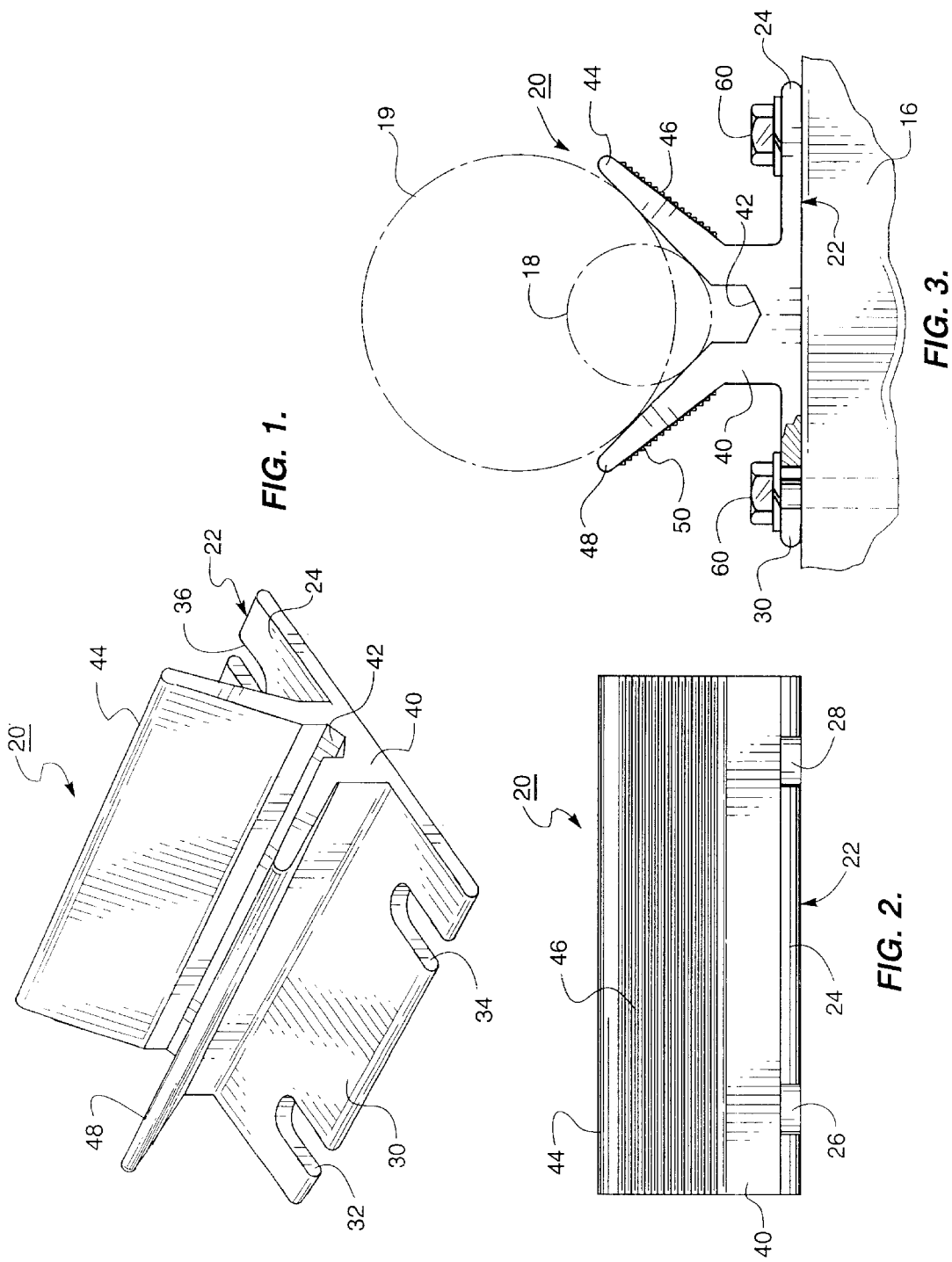

V-BLOCK FOR DRILLING ROUND OBJECTS

BACKGROUND OF THE INVENTION

1. Field of the Invention

This invention relates to a V-block for drilling round objects and, more particularly, to a V-block which may be secured to a drill press table for positioning a round object beneath the drill press.

2. Description of the Prior Art

The precise drilling on the diameter of a round or cylindrical object has long been a problem. The problem has been solved to a certain extent by providing a V-block which received the round object. The vee configuration of the V-block allows the round object to be appropriately centered, and then the V-block is disposed beneath the drill press.

Depending on the size of the V-block, round objects of various diameters may be drilled. However, one of the problems of the V-blocks of the prior art is in the lack of ability of drilling entirely through the round object diametrically. Typically, the round object is drilled through one side of a diameter and partially through the second side of the diameter. In order to drill completely through the round object, often the second diametrically opposed hole is only partially made, then the drill must be backed out, and the object being drilled is rotated 180° to allow for the completion of the drilling of the second diametrically opposed hole. The apparatus of the present invention overcomes this problem by providing a slot at the bottom of the V which may receive the point of the drill without damaging the V-block after the drilling is made completely through the round object.

Another problem with V-blocks of the prior art is the lack of ability to hold a round object being drilled while the drilling is being done. The apparatus of the present invention overcomes this problem by providing friction enhancing elements on the outside of the V-block. The friction enhancing elements allow a user to grasp the V-block and the round object being held in the V-block while the drilling is being accomplished.

SUMMARY OF THE INVENTION

The invention described and claimed herein comprises a V-block having a pair of angularly oriented sides for receiving a round object and a slot at the bottom of the V-block, or at the juncture of the side walls for receiving the tip of a drill to allow diametrically aligned holes to be drilled through the round object. The V-block apparatus also includes friction engaging elements on the outside of the V-block to enhance the grip of a user in holding a round object being worked on in the V-block.

Among the objects of the present invention are the following:

To provide new and useful V-block apparatus for holding a round object;

To provide a new and useful V-block having a slot for receiving the tip of a drill bit;

To provide new and useful V-block apparatus for holding a round element while the round element is being worked on; and To provide new and useful V-block apparatus including friction enhancing elements for holding a round object while the round object is being worked on.

BRIEF DESCRIPTION OF THE DRAWING

FIG. 1 is a perspective view of the apparatus of the present invention.

FIG. 2 is a side view of the apparatus of FIG. 1.

FIG. 3 is an end view of the apparatus of the present invention.

DESCRIPTION OF THE PREFERRED EMBODIMENT

FIG. 1 is a perspective view of V-block apparatus 20 of the present invention. FIG. 2 is a side view of the apparatus 20 of FIG. 1. FIG. 3 is an end view of the V-block apparatus 20 of the present invention. For the following discussion, reference will primarily to FIGS. 1, 2, and 3.

V-block apparatus 20 includes a base plate 22 which essentially includes two plate portions 24 and 30. Extending upwardly along the full length of the base plate 22 is a center pylon 40. The center pylon 40 essentially divides the base plate 22 into the two plate portions 24 and 30.

Figure 4:
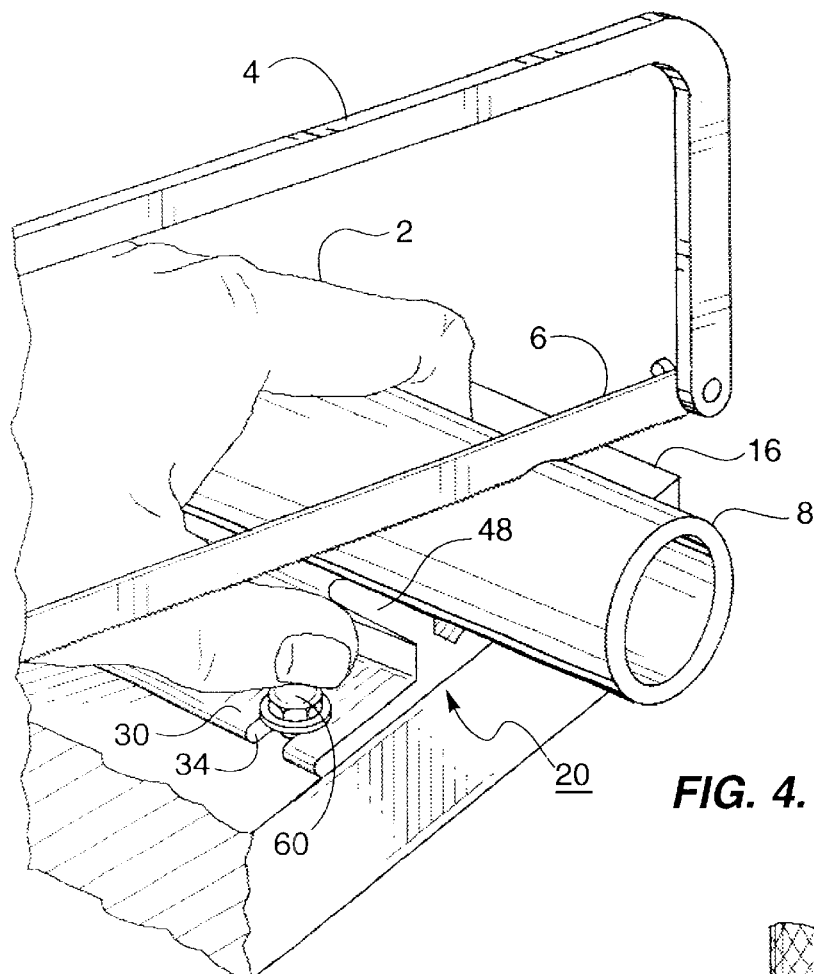
FIG. 4 is a perspective view of the apparatus of the present invention illustrating the apparatus.
Figure 5:
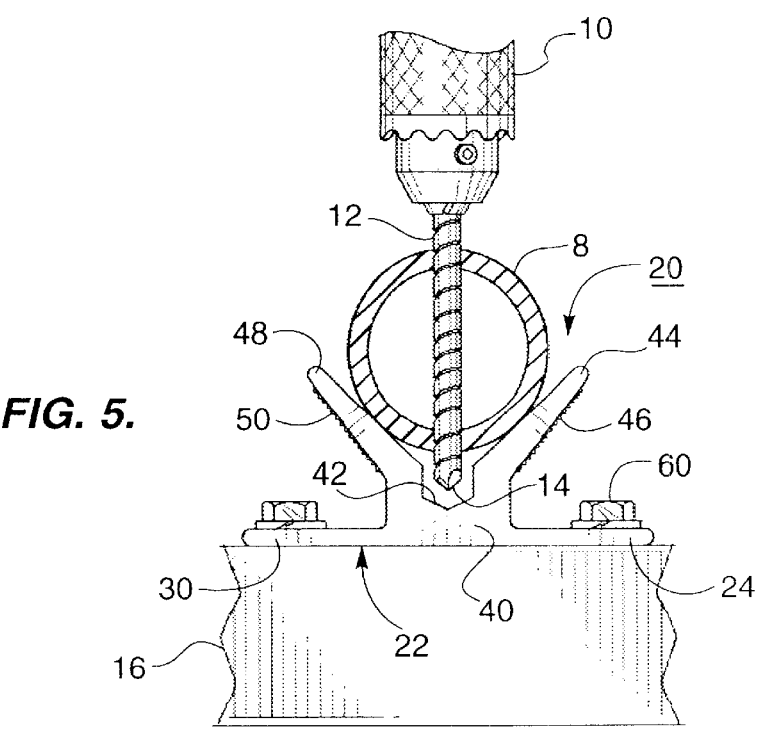
FIG. 5 is an end view of the apparatus of the present invention illustrating one use of the apparatus.

Extending inwardly from the outer edge of the plate portion 24 are two slots 26 and 28. Similarly, the base plate portion 30 includes two slots 32 and 34 which extend inwardly from the outer edge of the plate portion 30. The purpose of the slots 26, 28, 32, and 34 is to receive bolts 60, as shown in FIGS. 3, 4 and 5, for securing the apparatus 20 to a table or platform 16.

Extending upwardly and outwardly from the center pylon 40 are two wing elements 44 and 48. A V-groove 42 extends downwardly into the pylon 40 between the wing elements 44 and 48. The angular orientation between the wings 44 and 48 is essentially a right angle, or about ninety degrees. The two wing elements 44 and 48 define between them a trough for receiving an element, such as a pipe, to be worked on.

The bottom of the groove 42 comprises a V-shape slot, the angular orientation of which is about the same as the angle at the bottom tip or point of a drill bit. This may best be understood from FIG. 5.

FIG. 3, two dash/dot lines 18 and 19 describe the outlines of circular elements, such as pipes, which may be disposed between the wings 44 and 48, or disposed thereon, for appropriate work, as drilling or sawing.

FIG. 4 is a perspective view showing the V-block apparatus 20 secured to a table or platform 16 and with a pipe 8 disposed between the two wings 44 and 48. The Figure also shows a hand 2 of the user of the apparatus holding the pipe 8 in the V-block 20, and the V-block 20 is secured to the table or platform 16 by a plurality of bolts 60, one is shown disposed in the slot 34 of the base plate portion 30. A blade 6 of a hacksaw 4 is shown cutting into the pipe 8.

In FIGS. 2, 3, and 5 are shown horizontally extending ribs or grooves 46 and 50 on the wings 44 and 48, respectively. The ribs 46 and 50 are friction enhancing elements, the purpose of which is to help a user hold or grip an element disposed on the apparatus 20 while the element is being worked on. This is illustrated in FIG. 4. The hand 2 is disposed over the pipe 8 and is holding the pipe on to the apparatus while the pipe 8 is being cut by the blade 6 of the saw 4.

The grip of the hand 2 is enhanced by the ribs 46 and 50 on the wings 44 and 48, respectively. While the ribs 46 and 50 are not shown in FIG. 4, their presence may be clearly understood from FIGS. 2, 3, and 5.

While the ribs 46 and 50 are shown only on the outer sides of the wing elements 44 and 48, it is obvious that, if desired, the ribs or grooves may also be employed on the inside of the wing elements. Moreover, while only horizontally extending ribs or grooves are shown, other designs or configurations of friction enhancing elements may be used, such as a checked pattern, etc.

FIG. 5, which is an end view of the V-block apparatus 20 shown secured to the table or platform 16 by bolts 50, and with the pipe 8 disposed on the apparatus 20 and between the wings 44 and 48. Instead of a hacksaw, as shown in FIG. 4, the pipe 8 is being drilled by a drill bit 12 secured to a drill press 10. The drill bit 12 includes a tip or point 14 which is shown extending downwardly and into the V-groove 42 of the pylon 40, below the juncture of the wings 44 and 48. Note, as discussed above, that the V-shaped slot at the bottom of the groove 42 is about the same angle as that of the drill bit tip 14. This provides extra protection for the apparatus 20 so as to insure that the pipe 8 may be completely drilled through without also drilling into the pylon 40.

As shown in FIG. 5, the groove 42 allows the point 14 of a drill bit 12 to completely penetrate diametrically across the pipe 8. The point 14, disposed in the V-groove 42, thus does not directly contact the apparatus 20. The employment of the V-groove 42, which extends longitudinally or axially of the apparatus 20, as may be seen from FIG. 1, prevents damage to the apparatus 20 by the drill bit 12. At the same time, a pipe 8, or other element, disposed in the block apparatus 20 may be completely drilled through, diametrically, without interfering with the apparatus 20 itself.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Holder block apparatus for a drill press comprising in combination:
    a base plate, including a first plate portion and a second plate portion;
    a pylon extending upwardly from the first and second plate portions of the base;
    a first wing element extending upwardly and outwardly from the pylon in a first direction;
    a second wing element extending upwardly and outwardly from the pylon in a second direction and defining with the first wing a generally vee-shaped through for holding an object to be drilled; and
    a slot extending downwardly into the pylon from the trough.

2. The apparatus of claim 1 in which the first and second plate portions include slots for receiving fastening elements for securing the base plate to a table.

3. The apparatus of claim 1 which further includes friction enhancing elements on the wing elements.

4. The apparatus of claim 3 in which the friction enhancing elements comprise a plurality of grooves.

5. The apparatus of claim 1 in which the wing elements are disposed substantially perpendicularly to each other.

6. Holder block apparatus comprising in combination:
    base means including a first base plate and a second base plate;
    a pylon extending upwardly from the base means at the juncture of the first and second base plates;
    a pair of wing elements extending outwardly and upwardly from the pylon and defining between them a trough for receiving an element to be worked on; and
    friction enhancing elements on the pair of wing elements.

7. The apparatus of claim 6 which further includes a slot extending into the pylon at the juncture of the pair of wing elements.

8. The apparatus of claim 6 in which the wing elements are disposed substantially perpendicularly to each other.

9. Holder block apparatus for a drill press comprising in combination:
    a base plate;
    a pylon extending upwardly from the base;
    a first wing element extending upwardly and outwardly from the pylon in a first direction;
    a second wing element extending upwardly and outwardly from the pylon in a second direction and defining with the first wing a generally vee-shaped through for holding an object to be drilled
    friction enhancing elements on the first and second wing elements; and
    a slot extending downwardly into the pylon from the trough.

10. The apparatus of claim 9 in which the friction enhancing elements comprise a plurality of grooves.

11. The apparatus of claim 9 in which the friction enhancing elements are on the outside of the wing elements.

* * * * *